Aug. 30, 1927.  1,640,556

L. G. RILEY ET AL

CONTROL APPARATUS

Filed Feb. 14, 1921  4 Sheets-Sheet 1

WITNESSES:
R. S. Harrison
H. C. Lowe

INVENTORS
Lynn G. Riley, Andrew H. Candee
and Maurice F. Jones.
BY
ATTORNEY

Aug. 30, 1927.

L. G. RILEY ET AL 1,640,556

CONTROL APPARATUS

Filed Feb. 14, 1921    4 Sheets-Sheet 2

WITNESSES:

INVENTORS
Lynn G. Riley, Andrew H. Candee
and Maurice F. Jones,
BY
ATTORNEY

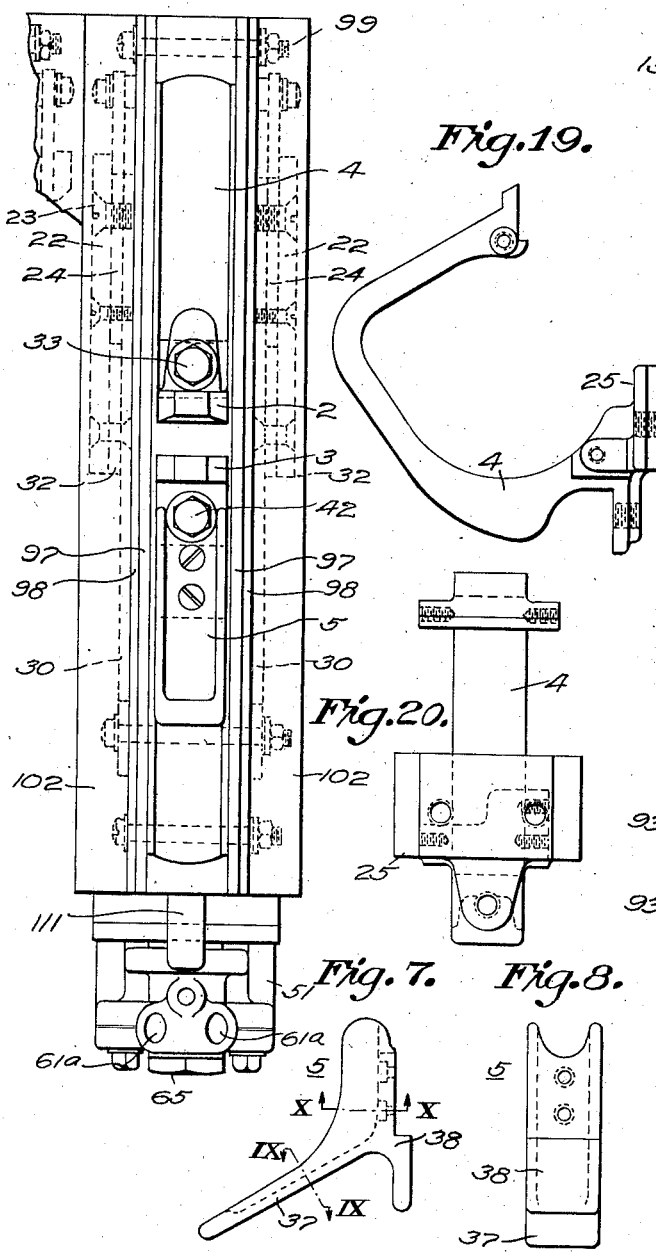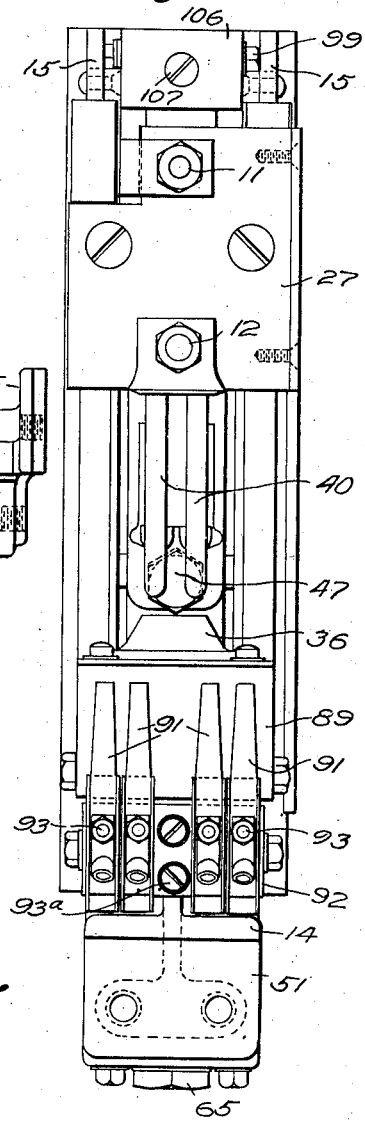

Aug. 30, 1927.
L. G. RILEY ET AL
1,640,556
CONTROL APPARATUS
Filed Feb. 14, 1921
4 Sheets-Sheet 4
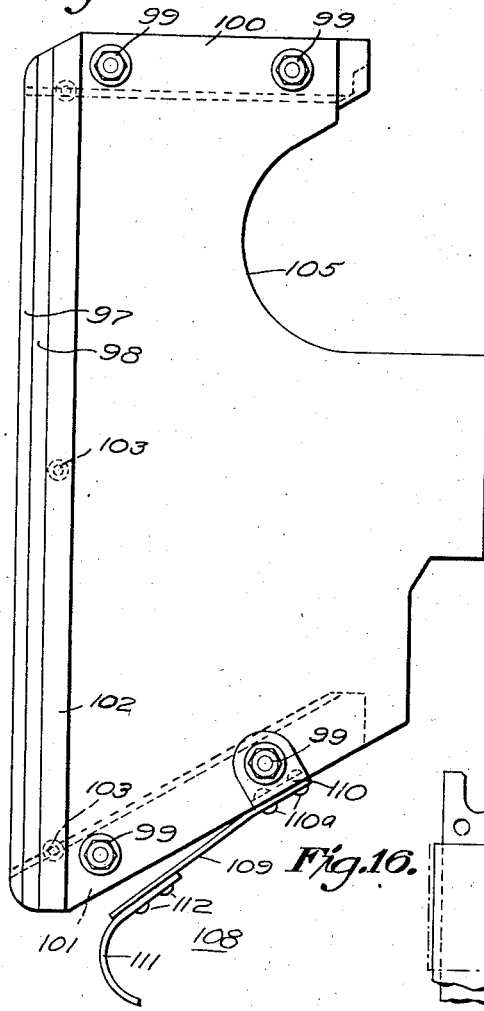
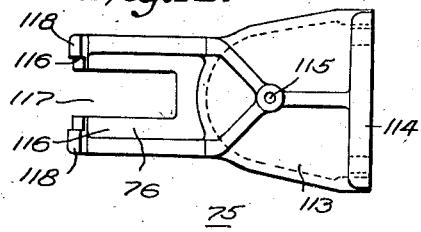
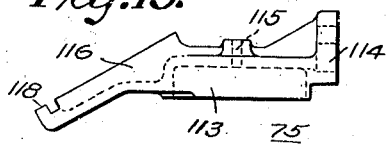
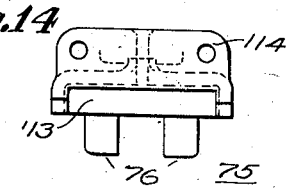
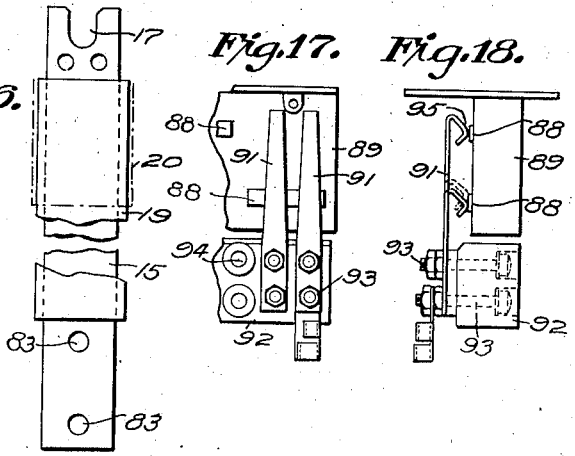
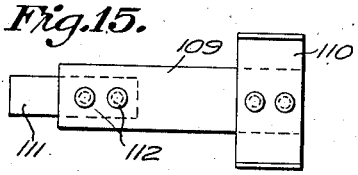
WITNESSES:
INVENTORS
Lynn G. Riley, Andrew H. Candee
and Maurice F. Jones,
BY
ATTORNEY Patented Aug. 30, 1927.

1,640,556

UNITED STATES PATENT OFFICE.

LYNN G. RILEY, OF WILKINSBURG, ANDREW H. CANDEE, OF FOREST HILLS, AND MAURICE F. JONES, OF WILKINSBURG, PENNSYLVANIA, ASSIGNORS TO WESTINGHOUSE ELECTRIC & MANUFACTURING COMPANY, A CORPORATION OF PENNSYLVANIA.

CONTROL APPARATUS.

Application filed February 14, 1921. Serial No. 444,708.

Our invention relates to control apparatus and it has particular relation to switching devices that open and close energized circuits.

One object of our invention is to provide improved fingers for opening and closing auxiliary cricuits or circuits of low potential.

A second object of our invention is to provide an improved circuit-making-and-breaking device which has a movable arcing horn that is not an integral part of a movable contact terminal.

A third object of our invention is to provide an improved arcing box which may readily be detached from a switching device for permitting inspection thereof.

Another object of our invention is to provide a new electromagnetic device for operating a valve that controls the application of compressed air to the switching device.

Still another object of our invention is to provide a novel method of mounting the switches, that shall permit of their ready removal from a plurality of supporting members upon which they are mounted and whereby each switch shall be firmly maintained in position by the aid of other corresponding switches and the supporting member.

Still another object of our invention is to so design the switching devices that they shall present a substantially solid front when they are arranged in side by side relation.

Another object of our invention is to provide a new arrangement of pneumatic conductors which shall be simple in construction and effective in operation, for supplying compressed air to a plurality of switching devices.

Briefly speaking, our invention consists in providing a switching device which shall be capable of breaking a relatively heavy current-carrying circuit, which shall permit of ready inspection, which shall have great durability, and which shall be controlled electro-pneumatically in such a manner that the control circuit therefor will require relatively slight energy for governing the switching device.

For a better understanding of our invention, reference should be made to the accompanying drawings, Figure 1 of which is a view, in side elevation, of a switching device embodying our inventon;

Figs. 5 and 6 are views, in front and in rear elevation, respectively, of the switching device shown in Fig. 1;

Figs. 7 and 8 are views, in side and in end elevation, respectively, of the lower arcing horn that is shown in Fig. 1;

Figs. 9 and 10 are cross-sectional views, taken along the lines IX—IX and X—X, respectively, of Fig. 7;

Fig. 11 is a view, in side elevation, of an arcing box shown in Fig. 1;

Figure 1:
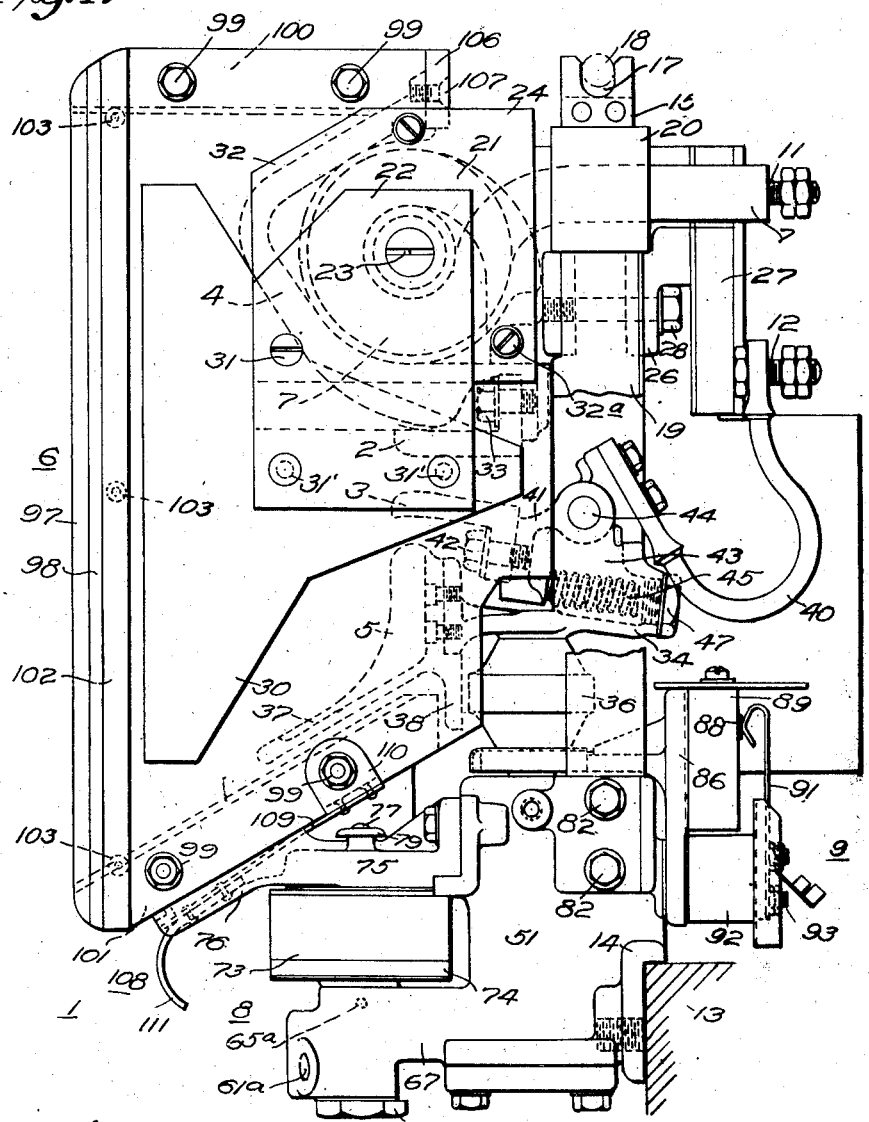
Figure 2:
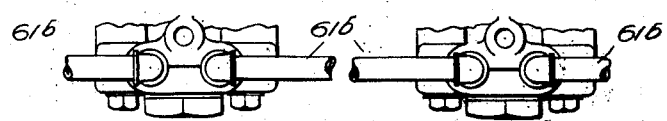
Fig. 2 is a detail view, in side elevation, of apparatus shown in Fig. 1.

Figs. 12 to 18, inclusive, are detail views of parts of the apparatus shown in Fig. 1, which will hereinafter be more fully described; and Figs. 19 and 20 are views, in side and in end elevation, respectively, of the upper arcing horn that is shown in Fig. 1.

Referring particularly to Fig. 1, a switching device 1 comprises a stationary contact member or terminal 2, a movable contact member or terminal 3, an upper arcing horn 4, a lower arcing horn 5, an arc box 6, a blow-out coil 7, an electro-pneumatically operated valve mechanism 8, auxiliary contact device 9 and switch terminals 11 and 12.

The switching device 1 is positioned upon a supporting member 13 by means of a shoulder portion or projection 14 upon the device 1. The principal parts of the switching device 1 are secured to two parallel vertically extending mounting bars 15 as will be more fully hereinafter described. The bars 15 are maintained in a vertical position by a grooved end portion 17, with which each is provided, engaging a horizontally-extending supporting member or rod 18.

The parallel supporting members 13 and 18 extend horizontally a sufficient distance to permit mounting, in side-by-side relation, the number of switching devices 1 that are required for a particular control system.

The vertical mounting bars 15 are covered with a jacket 19 of suitable impregnated insulating material. An additional covering or coating 20 of insulating material is moulded upon the upper portion of the mounting bars 15 to provide greater support for parts of the device 1, which will hereinafter be further described.

The blow-out coil 7 is mounted upon a core member 21 of substantially spool shape which is secured to a plurality of substantially rectangular pole-pieces 22 by a threaded member or bolt 23. A sheet 24 of suitable insulating material is positioned between core member 21 and each of the pole-pieces 22, which are on both sides thereof, by the threaded member 23.

The upper arcing horn 4 (see Figs. 19 and 20) is of substantially U-shape and has an expanded end portion or bracket 25 for securing it to the mounting bars 15. A bracket 26 is provided for supporting a flat insulating member 27 upon which the contact terminals 11 and 12 are mounted. The bracket 25 of the arcing horn 4 and the bracket 26 are secured to each other and fastened upon the mounting bars 15 by bolts 28.

A substantially triangular pole-piece 30 is secured to each of the pole-pieces 22 by means of bolts 31. A flat rectangular metal strip 32 is employed as a filler plate between each of the pole-pieces 30 and the pole-pieces 22 and magnetically connects them together. A portion of the insulating member 24 is also rigidly positioned between the pole-pieces 22 and 30 by one of the bolts 31. A bolt 32a is employed for securing the insulating member 24 to the arcing horn 4.

The upper or stationary contact member 2 is securely fastened to the upper arcing horn 4 by means of a bolt 33. The contact member 2 is electrically connected to the switch terminal 11 by a portion of the arcing horn 4 and the blow-out coil 7.

The switch terminals 11 and 12 are positioned in substantially the same plane upon the flat insulating member 27. By having the contact terminals 11 and 12 of each of the switching devices in substantially the same plane, the terminals of the switching devices 1 may be readily inter-connected by flat metallic conductors (not shown).

Figure 3:
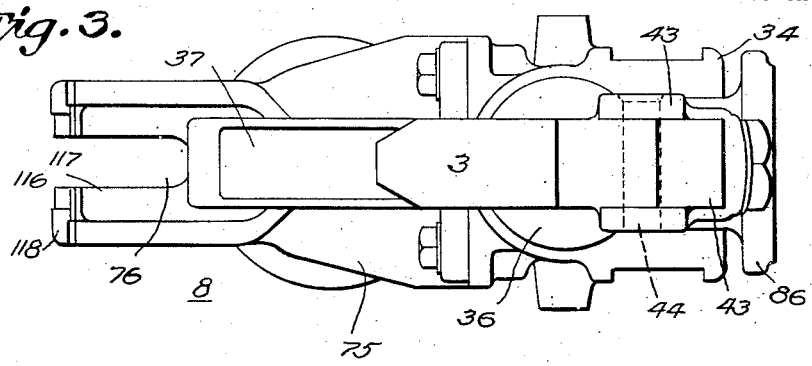
Fig. 3 is a plan view of a movable contact member, arcing horn and electromagnetic device, which are also shown in Fig. 1, for controlling the operation of our switch.
Figure 4:
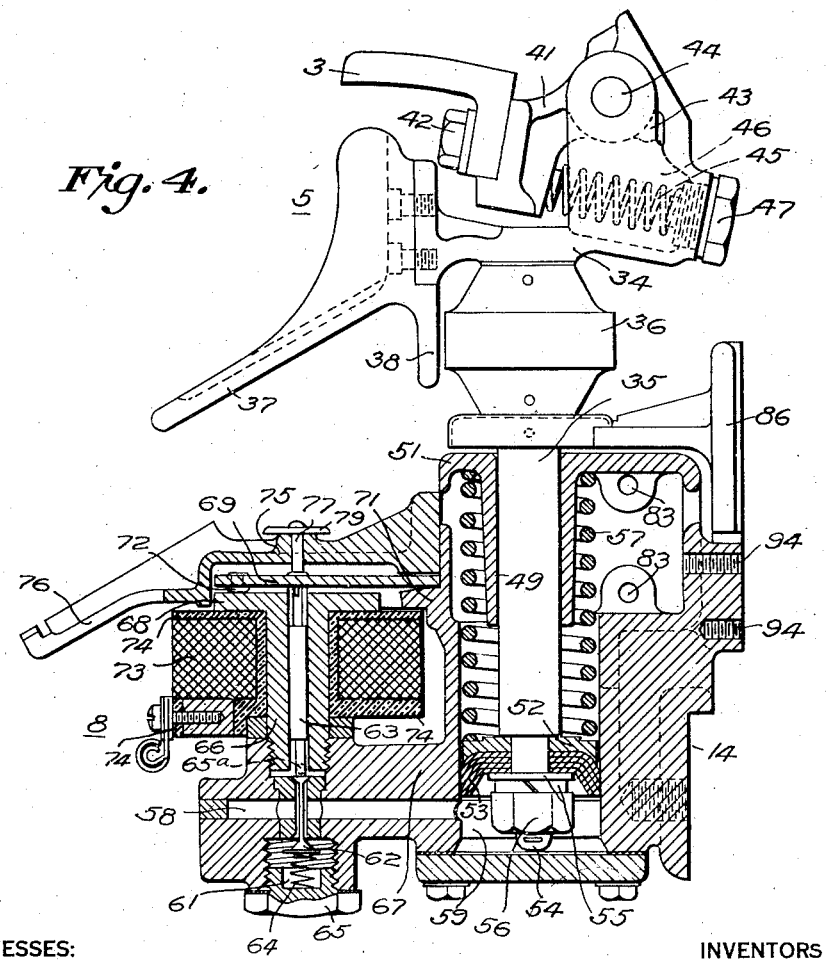
Fig. 4 is a view, partially in side elevation and partially in section, of the parts shown in Fig. 3.

For a better understanding of the movable portions of the switching device 1, particularly the arcing horn 5, the contact member 3 and the electro-pneumatic valve-operating device 8, reference should be made to Figs. 3 and 4.

The movable arcing horn 5 is securely fastened to a bracket 34 which is mounted upon a piston rod 35. The piston rod 35 is insulated from the bracket 34 by means of a member 36 made of suitable insulating material.

The arcing horn 5, which is best illustrated in Figs. 7, 8, 9 and 10, comprises a relatively long horn portion or projection 37 and a shoulder portion 38 for positioning it upon the bracket 34.

The contact member 3 is rigidly secured to the terminal bracket 41 by means of a bolt 42. The terminal bracket 41 is pivotally mounted between a pair of supporting arms 43, which are parts of the bracket 34, by means of a pin 44. The contact member 3 is electrically connected to the arcing horn 5 by the brackets 34 and 41 and pin 44. The terminal bracket 41 is electrically connected to the switch terminal 12 by a conductor 40 (see Fig. 1).

The terminal bracket 41 and the contact member 3 are biased to a slightly inclined position from the horizontal by means of a resilient member or spring 45, which is positioned between, and by, the contact terminal bracket 41 and a recessed portion 46 which is a part of the bracket 34. A bolt 47 permits the adjustment of the spring 45.

The piston rod 35 is positioned within a tubular guide portion 49 which is a part of a hollow casting 51. The piston rod 35 has a piston 52 and suitable piston packing 53 secured thereto by means of a threaded extension 54, which is a part of the piston rod 35, washers 55 and a nut 56. A spring or resilient member 57 is positioned upon the tubular guide portion 49 and biases the piston 52 to its lower position.

The piston is actuated in an upward direction upon air, or some other suitable fluid under pressure, being admitted from a passage 58 to a chamber 59 that is situated below the piston 52. The admission of air to the passage 58 from an inlet chamber 61 is controlled by a valve member 62 which is mounted upon a valve stem 63. The inlet chamber 61 of each of the switching devices 1 is provided with a plurality of inlet openings 61a (see Fig. 5) for admitting air or some other suitable fluid to the chamber 61. The inlet chambers 61 are pneumatically connected in series relation by suitable pipes or conveyors 61b. The first of the conveyors 61b is connected to a suitable source of fluid pressure.

The valve chamber 62 is maintained in its closed position by a resilient member 64 and a nut 65. An exhaust port 65a (see Figs. 1 and 4) is provided for discharging air from the chamber 59 when the valve member 62 is in its upper or closed position.

The valve stem 63 is positioned within a hollow magnetizable core member 66. The core member 66 is positioned within a laterally projecting portion 67 of the casting 51. The core member 66 is provided, at its upper end, with a flat circular portion 68. A flat broad armature member 69 actuates the valve stem 63 and is loosely mounted thereon and upon a projecting portion 71 which forms a part of the hollow casting 51. The projecting portion 71 has an upper curved surface of relatively great radius in contact with the armature member 69. When the armature member 69 is drawn downward toward the core member 66, the member 69 maintains a rolling contact upon the curved surface of the projecting portion 71.

A bronze pin 72 is positioned in the armature member 69 to prevent it from "freezing" to the upper flat portion 68 of the magnetizable core member 66 by reason of residual magnetism. A solenoid 73 is mounted upon the core member 66 and is insulated therefrom by suitable insulating material 74. The solenoid 73 is maintained in position by the flat projecting portion 68 and the laterally projecting portion 67 of the hollow casting 51. Suitable terminals 74 are provided for the solenoid 62 in accordance with well-known practice.

The armature member 69 is confined by a cover or encasing member 75 having a slanting projection 76 extending therefrom, which will be hereinafter described in detail.

A pin 77 extends through the encasing member 75 and serves to actuate the armature 69 and the valve stem 63 when it is desirable to manually operate the valve member 62. The pin 77 is provided with an expanded top portion 79 to prevent moisture from entering the opening between the encasing member 75 and the pin 77.

The hollow casting 51 is secured to the mounting bars 15 by bolts 82 (see Fig. 1). The bolts 82 are positioned within holes 83 of the mounting bars 15, as shown in Fig. 16 of the drawing.

The auxiliary contact device 9 comprises a movable bracket 86 securely fastened to the piston rod 35 and moving therewith. A plurality of contact segments 88 are mounted upon an insulating member or block 89 which is secured to the bracket 86 and is actuated thereby (see Figs. 6, 17 and 18).

Contact segments 88 are engaged by suitable auxiliary contact fingers 91, each of which is fixedly mounted upon a stationary insulating block 92 by means of a plurality of bolts 93 which serve as contact terminals. The block 92 is secured to the hollow casting 51 by bolts 93a (see Fig. 6) which are positioned in the holes 94.

The contact fingers 91 are of new design, as the V-shaped portion 95 thereof is formed by bending the outer end of each of the fingers 91 inwardly. By forming the contact finger 91 in this manner, a greater length of active spring material is provided therefor than would be provided if the V-shaped portion 95 were not bent backwardly upon the finger 91 but were formed in the usual manner. This increase in the effective length of the finger 91 is substantially equal to the width of the top of the V-shaped portion 95. The auxiliary circuits, comprising the contact fingers 91 and the contact segments 88, are opened or closed upon the piston rod 35 being actuated.

The arc box 6 comprises a plurality of flat insulating members 97 and 98, which fit tightly together and are located on both sides of the contact terminals 2 and 3 and between them and the pole-pieces 30. The members 97 and 98 on one side are secured to the corresponding side-pieces 97 and 98 upon the opposite side of the coil 7 by means of bolts 99 which extend through upper arcing block 100 and lower arcing block 101. These blocks are composed of suitable insulating material, such as soapstone.

Projecting members 102 are positioned at right angles to the side members or barriers 97 and 98 by means of screws 103. The side projecting members 102 are so made that, upon a plurality of switching devices 1 being placed in side-by-side relation, the corresponding projecting members 102 may be brought into engagement to form a substantially plane surface near the front of the switching devices 1.

The side member or barriers 97 and 98 are provided with curved portions 105 which permit the arcing box 6 to be brought into tight engagement with the blow-out coil 7.

The arcing box 6 is positioned upon the switching device 1 by inserting it between the pole-pieces 30 and forcing it diagonally upward until it is stopped by an insulating block or member 106 which is secured to the upper arcing horn 4 by means of a screw 107 (see Fig. 1) and also by a portion of the bracket 25 forming a part of the arcing horn 4. The lower arcing block 101 of the box 6 slides upon the slanting projection 76.

The lower portion of the arcing box 6 is locked in position by a latching device 108 comprising a latching spring 109 which is secured to the arcing box 6 by means of a latching bracket 110, rivets 110a and the bolt 99. A hook 111 is fastened to the latching spring 109 by a rivet 112. The hook 111 is of less width than the latch spring 109 and is positioned upon the under side thereof.

When the arcing box 6 is in position, the latching spring 109 engages the slanting portion 76 of the encasing member 75 which has been previously mentioned. The encasing member 75 is best illustrated in Figs. 12, 13 and 14 and comprises an irregular shaped casting having a hollow dome portion 113, a projecting lug 114 for securing it to the cylindrical casting 51 and circular hole 115 for the pin 77.

The slanting portion 76 of the encasing member 75 comprises two arms 116 having a slot 117 therebetween, in which the hook 111 is positioned. A lug 118 at the end of each of the projecting arms 116 prevents the latching spring 109 from sliding forward.

The arcing box 6 may be removed by lifting up the hook 111 and then withdrawing the arcing box 6 from between the pole-pieces 30.

The operation of the contactor or switching device 1 is begun by energizing the solenoid 73 thereof. This energization is governed either by a master controller (not shown) or otherwise.

When the solenoid 73 is energized, a magnetic circuit is established comprising the core member 66, the hollow casting 51 and the armature member 69. The armature member 69 is drawn downward, thereby actuating the valve stem 63 and the valve member 62.

Fluid from a suitable source of fluid pressure is conveyed from the pipe 61b through inlet chamber 61, past the valve member 62 and through the passage 58, into the chamber 59. The pressure applied to the piston 52 is sufficient to actuate it upwardly, thereby compressing the spring 57. The piston rod 35 is actuated upwardly by the piston 52, thereby raising the contact terminal 3 and the arcing horn 5. The tip of the contact terminal 3 will first engage the tip of the stationary contact terminal 2, and a rolling action will occur as the entire contact surface of the terminal 3 becomes positioned against the contact terminal 2. This rolling action is secured by the contact terminal 3 being pivotally mounted and being biased in an upward direction by means of the resilient member 45.

As soon as the contact members 2 and 3 are brought into engagement, a circuit is established from the switch terminal 11 to the blowout coil 21, a portion of the arcing horn 4, contact members 2 and 3, contact bracket 41, conductor 40 and switch terminal 12.

When the piston rod 35 is forced upward, the supporting member 89 for the contact segments 88 is actuated thereby to raise the contact segments 88, thereby breaking or establishing electrical connections with the contact fingers 91, in accordance with predetermined design.

The switching device 1 may be permitted to assume its open position by opening the circuit which energizes the solenoid 73. When the solenoid 73 is de-energized, the magnetic attraction of the core member 66 ceases, and armature member 69 is actuated upwardly by the resilient member 64 assisted by the action of the fluid acting upon the valve member 62 and the valve stem 63.

As soon as the valve member 62 reaches its upper position, pressure is no longer applied to the piston 52 and the air or other fluid confined within the chamber 59 is permitted to escape through the exhaust port 65a. The spring or resilient member 57 will actuate the piston 52 downwardly. When the piston rod 35 is lowered, the arcing horn 5 and the contact terminal 3 are likewise actuated to their lower positions.

The arc formed between the contact terminals 2 and 3 is blown outwardly by the magnetic circuit comprising the magnet coil 21, core member 23 and the pole pieces 22 and 30, between the arcing horns 4 and 5, until it is cooled sufficiently to become extinguished.

It will be noted that the soapstone barrier 109 and the insulating member 106 prevent the arc from spreading upwardly beyond the arcing horn 4 to other metallic parts of the switching device 1.

It is also to be noted that the contact terminal 3, when assuming its open position, has movement relative to both the stationary contact terminal 2 and the arcing horn 5. The tip of the contact terminal 3 is actuated from the adjacent portion of the arcing horn 5, by the resilient member 45.

When the piston rod 35 descends, the supporting member 89, upon which the contact segments 88 are mounted, is actuated downwardly, thereby breaking or establishing circuits through the contact fingers 91 and the contact segments 88, in accordance with predetermined design.

From the above description, it is apparent that a number of novel features have been embodied in our switching device tending to make it more compact and requiring less expenditure of electrical energy to control its operation than has heretofore been accomplished. These features have been secured without lessening its positive and effective operation and its arc-interrupting capacity.

While we have shown our invention in a preferred form, it is apparent that minor modifications may be made in the arrangement and shape of the parts of the apparatus without departing from the spirit of our invention. We desire, therefore, to be limited only by the scope of the appended claims.

We claim as our invention:

1. The combination with a switching device comprising a stationary arc horn and a stationary valve member, said horn and said valve member having surfaces which are substantially parallel, of an arcing box having surfaces substantially parallel to the parallel surfaces of said horn and said valve member for mounting said box upon said horn and said valve member, the said surfaces of said box slidingly engaging the corresponding surfaces of said horn and said valve member, and means for latching said box into position.

2. The combination with a plurality of substantially similar switching devices and means for supporting said devices in side-by-side relation, of a plurality of arcing boxes, one box being mounted upon each of said devices, said boxes being so shaped that a substantially continuous wall is formed along the front of said devices by said boxes.

3. The combination with a plurality of switching devices in side-by-side relation, each of said devices having a grooved portion and a shoulder portion, stationary means coacting with each of said shoulder portions and said grooved portions for steadying said devices, and means comprising a plurality of arcing boxes for preventing lateral movement of said devices, said boxes being in intimate contact with each other.

In testimony whereof we have hereunto subscribed our names this 8th day of February, 1921.

LYNN G. RILEY.
ANDREW H. CANDEE.
MAURICE F. JONES.